US012108476B2

United States Patent
Takahashi et al.

(10) Patent No.: US 12,108,476 B2
(45) Date of Patent: Oct. 1, 2024

(54) TERMINAL AND BASE STATION

(71) Applicant: NTT DOCOMO, INC., Tokyo (JP)

(72) Inventors: Hideaki Takahashi, Tokyo (JP); Kazuaki Takeda, Tokyo (JP); Tianyang Min, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 335 days.

(21) Appl. No.: 17/615,727

(22) PCT Filed: Jun. 7, 2019

(86) PCT No.: PCT/JP2019/022733
§ 371 (c)(1),
(2) Date: Dec. 1, 2021

(87) PCT Pub. No.: WO2020/246024
PCT Pub. Date: Dec. 10, 2020

(65) Prior Publication Data
US 2022/0240335 A1    Jul. 28, 2022

(51) Int. Cl.
*H04W 76/18* (2018.01)
*H04W 76/16* (2018.01)
(Continued)

(52) U.S. Cl.
CPC ........... *H04W 76/16* (2018.02); *H04W 76/19* (2018.02); *H04W 76/20* (2018.02)

(58) Field of Classification Search
CPC ..... H04W 76/16; H04W 76/19; H04W 76/20; H04W 76/15
See application file for complete search history.

(56) References Cited

U.S. PATENT DOCUMENTS 11,073,401 B1 *   7/2021   Blanc-Paques .... G01C 21/3852
11,438,951 B2 *   9/2022   Fiorani ................ H04B 17/318
(Continued)

FOREIGN PATENT DOCUMENTS

WO     2014/132560 A1     9/2014
WO     2016/021541 A1     2/2016
WO     WO-2019101162 A1 * 5/2019 ............ H04W 24/10

OTHER PUBLICATIONS

Office Action issued in counterpart Japanese Patent Application No. 2021-524637 mailed on Feb. 28, 2023 (3 pages).
(Continued)

*Primary Examiner* — Lan-Huong Truong
(74) *Attorney, Agent, or Firm* — Osha Bergman Watanabe & Burton LLP

(57) ABSTRACT

A terminal includes a reception unit for receiving, from a base station that is a master node, a first message to configure communications with a master cell group and a secondary cell group, a communication unit for performing the communications with the master cell group and the secondary cell group configured that are based on the first message, a control unit for detecting an occurrence of a failure in communications with the secondary cell group, and a transmission unit for transmitting, when the control unit detects the occurrence of the failure in the communications with the secondary cell group, a second message including information indicating the occurrence of the failure in the secondary cell group, wherein the control unit includes location information in the second message when the first message is configured to have information indicating that the location information is to be included in the second message.

4 Claims, 15 Drawing Sheets

(51) Int. Cl.
*H04W 76/19* (2018.01)
*H04W 76/20* (2018.01)

(56) References Cited

U.S. PATENT DOCUMENTS

| | | | |
|---|---|---|---|
| 11,558,922 B2* | 1/2023 | Vivanco | H04W 76/34 |
| 2016/0007403 A1 | 1/2016 | Futaki et al. | |
| 2017/0215078 A1* | 7/2017 | Mochizuki | H04W 4/90 |
| 2020/0305213 A1* | 9/2020 | Teyeb | H04W 72/23 |

OTHER PUBLICATIONS

Office Action in the counterpart Saudi Arabian Application No. 521431009, mailed Nov. 22, 2023 (12 pages).
International Search Report issued in PCT/JP2019/022733 on Jul. 9, 2019 (5 pages).
Written Opinion of the International Searching Authority issued in PCT/JP2019/022733 on Jul. 9, 2019 (5 pages).
3GPP TS 36.331 V15.5.1; "3rd Generation Partnership Project; Technical Specification Group Radio Access Network; Evolved Universal Terrestrial Radio Access (E-UTRA); Radio Resource Control (RRC); Protocol specification (Release 15)"; Apr. 2019 (948 pages).
Rohde & Schwarz, Qualcomm Incorporated; "Correction to eMDT test case 8.6.10.1"; 3GPP TSG-RAN WG5 Meeting #68, R5-153550; Beijing, China; Aug. 24-28, 2015 (6 pages).
3GPP TS 23.271 V15.1.0; "3rd Generation Partnership Project; Technical Specification Group Services and System Aspects; Functional stage 2 description of Location Services (LCS) (Release 15)"; Sep. 2018 (184 pages).
3GPP TS 37.340 V15.5.0; "3rd Generation Partnership Project; Technical Specification Group Radio Access Network; Evolved Universal Terrestrial Radio Access (E-UTRA) and NR; Multi-connectivity; Stage 2 (Release 15)"; Mar. 2019 (68 pages).
3GPP TS 38.300 V15.5.0; "3rd Generation Partnership Project; Technical Specification Group Radio Access Network; NR; NR and NG-RAN Overall Description; Stage 2 (Release 15)"; Mar. 2019 (97 pages).
Office Action in the counterpart Chinese Application 201980097112.4, mailed Jun. 29, 2023 (14 pages).
Extended European Search Report issued in European Application No. 19932128.2 mailed on Dec. 12, 2022 (11 pages).
Notice of Reasons for Refusal issued in Japanese Application No. 2021-524637 mailed on Dec. 13, 2022 (5 pages).
Ericsson, "Secondary Radio Link Failure (S-RLF)", 3GPP TSG-RAN WG2 #85bis, Tdoc R2-141542, Valencia, Spain, Mar. 31-Apr. 4, 2014 (5 pages).
Office Action in Chinese Application No. 201980097112.4, mailed Dec. 25, 2023 (12 pages).
Office Action issued in counterpart Chinese Application No. 201980097112.4, mailed May 23, 2024 (14 pages).
Huawei, HiSilicon: "TP on use cases for MDT in MR-DC", 3GPP TSG-RAN WG2 Meeting #105bis, R2-1904824; Xi'an, China, Apr. 8-12, 2019 (4 pages).
NEC: "SCG failure indication from MN to Sn", 3GPP TSG-RAN WG2 NR Ad-Hoc#2, R2-1707377; Qingdao, China, Jun. 27-29, 2017 (4 pages).

* cited by examiner

FIG.6

*OtherConfig information element*

```
-- ASN1START
OtherConfig-r9 ::= SEQUENCE {
    reportProximityConfig-r9    ReportProximityConfig-r9    OPTIONAL,    -- Need ON
    ...,
    [[
    obtainLocationInfoViaSCG-Failure-r16    BOOLEAN    OPTIONAL -- Need ON
    ]]
}
[...]
-- ASN1STOP
```

FIG.7

SCGFailureInformationNR message

```
-- ASN1START
SCGFailureInformationNR-r15  ::=    SEQUENCE {
    criticalExtensions          CHOICE {
        c1                          CHOICE {
            scgFailureInformationNR-r15    SCGFailureInformationNR-r15-IEs,
[...]
}

SCGFailureInformationNR-r15-IEs  ::=  SEQUENCE {
    failureReportSCG-NR-r15        FailureReportSCG-NR-r15    OPTIONAL,
    nonCriticalExtension           SEQUENCE {}                OPTIONAL
}

FailureReportSCG-NR-r15  ::=  SEQUENCE {
    failureType-r15                ENUMERATED {
        t310-Expiry, randomAccessProblem, rlc-MaxNumRetx,
        scg-reconfigFailure, srb3-IntegrityFailure},
[...]
    [[
    locationInfo-r16               LocationInfo-r10           OPTIONAL
    ]]
}
-- ASN1STOP
```

SCGFailureInformationNR field descriptions

*locationInfo*
The field contains available location at the UE upon SCG failure in NR.

FIG. 8

SCGFailureInformation message

```
-- ASN1START
SCGFailureInformation-r12 ::=    SEQUENCE {
    criticalExtensions              CHOICE {
        c1                              CHOICE {
            scgFailureInformation-r12       SCGFailureInformation-r12-IEs,
            spare3 NULL, spare2 NULL, spare1 NULL
        },
        criticalExtensionsFuture        SEQUENCE {}
    }
}
SCGFailureInformation-r12-IEs ::= SEQUENCE {
    failureReportSCG-r12            FailureReportSCG-r12            OPTIONAL,
    nonCriticalExtension            SCGFailureInformation-v1310-IEs OPTIONAL
}

-- Regular non-critical extensions:
FailureReportSCG-r12 ::=    SEQUENCE {
    failureType-r12             ENUMERATED {t313-Expiry, randomAccessProblem,
                                rlc-MaxNumRetx, scg-ChangeFailure },
    [[
    locationInfo-r16            LocationInfo-r10                OPTIONAL
    ]]
}
-- ASN1STOP
```

SCGFailureInformation field descriptions

*locationInfo*
The field contains available location at the UE upon SCG failure in E-UTRA.

FIG.9

LocationInfo information element

```
-- ASN1START
LocationInfo-r10 ::= SEQUENCE {
    locationCoordinates-r10        CHOICE {
        ellipsoid-Point-r10                              OCTET STRING,
        ellipsoidPointWithAltitude-r10                   OCTET STRING,
        ...,
        ellipsoidPointWithUncertaintyCircle-r11          OCTET STRING,
        ellipsoidPointWithUncertaintyEllipse-r11         OCTET STRING,
        ellipsoidPointWithAltitudeAndUncertaintyEllipsoid-r11   OCTET STRING,
        ellipsoidArc-r11                                 OCTET STRING,
        polygon-r11                                      OCTET STRING
    },
    horizontalVelocity-r10         OCTET STRING               OPTIONAL,
    gnss-TOD-msec-r10              OCTET STRING               OPTIONAL,
    ...,
    [[ verticalVelocityInfo-r15    CHOICE {
        verticalVelocity-r15                             OCTET STRING,
        verticalVelocityAndUncertainty-r15 OCTET STRING
    }                              OPTIONAL
    ]]
}
-- ASN1STOP
```

FIG.10

OtherConfig information element

```
-- ASN1START
-- TAG-OTHERCONFIG-START

OtherConfig ::=                     SEQUENCE {
    delayBudgetReportingConfig  CHOICE{
        release                     NULL,
        setup                       SEQUENCE{
            delayBudgetReportingProhibitTimer    ENUMERATED {s0, s0dot4,
s0dot8, s1dot6, s3, s6, s12, s30}
        }
    }                                                           OPTIONAL    -- Need M
}

OtherConfig-v1540 ::=               SEQUENCE {
    overheatingAssistanceConfig     SetupRelease {OverheatingAssistanceConfig}
OPTIONAL,    -- Need M
    ...,
    [[
    obtainLocationInfoViaSCG-Failure-r16    BOOLEAN         OPTIONAL    -- Need M
    ]]
}
[...]
-- TAG-OTHERCONFIG-STOP
-- ASN1STOP
```

FIG. 12

SCGFailureInformation message

```
-- ASN1START
-- TAG-SCGFAILUREINFORMATION-START

SCGFailureInformation ::=          SEQUENCE {
    criticalExtensions                 CHOICE {
        scgFailureInformation              SCGFailureInformation-IEs,
        criticalExtensionsFuture           SEQUENCE {}
    }
}

SCGFailureInformation-IEs ::=      SEQUENCE {
    failureReportSCG                   FailureReportSCG                OPTIONAL,
    nonCriticalExtension               SEQUENCE {}                     OPTIONAL
}

FailureReportSCG ::=               SEQUENCE {
    failureType                        ENUMERATED {
    [...]
    ...,
    [[
    locationInfo-r16                   LocationInfo-r16                OPTIONAL
    ]]
}
[...]

-- TAG-SCGFAILUREINFORMATION-STOP
-- ASN1STOP
```

SCGFailureInformation field descriptions

*locationInfo*
The field contains available location at the UE upon SCG failure in NR.

FIG.13

LocationInfo information element

```
-- ASN1START
-- TAG-LOCATIONINFO-START

LocationInfo-r16 ::= SEQUENCE {
    locationCoordinates-r16         CHOICE {
        ellipsoid-Point-r16                             OCTET STRING,
        ellipsoidPointWithAltitude-r16                  OCTET STRING,
        ....,
        ellipsoidPointWithUncertaintyCircle-r11         OCTET STRING,
        ellipsoidPointWithUncertaintyEllipse-r11        OCTET STRING,
        ellipsoidPointWithAltitudeAndUncertaintyEllipsoid-r11  OCTET STRING,
        ellipsoidArc-r11                                OCTET STRING,
        polygon-r11                                     OCTET STRING
    },
    horizontalVelocity-r16                              OCTET STRING        OPTIONAL,
    gnss-TOD-msec-r16                                   OCTET STRING        OPTIONAL,
    verticalVelocityInfo-r15    CHOICE {
        verticalVelocity-r15                            OCTET STRING,
        verticalVelocityAndUncertainty-r15 OCTET STRING
    }                                                                       OPTIONAL
}

-- TAG-LOCATIONINFO-STOP
-- ASN1STOP
```

TERMINAL AND BASE STATION

TECHNICAL YIELD

The present invention relates to a terminal and base station in a radio communication system.

BACKGROUND ART

In NR (New Radio) (also referred to as "5G"), a successor system to LIE (Long Term Evolution), technologies that satisfy requisite conditions such as a high capacity system, high data transmission rate, low latency, simultaneous connection of multiple terminals, low cost, power saving, etc. are studied (for example, NPL 1).

In the NR system, a technique called LTE-MR dual connectivity, NR-NR dual connectivity, or Multi Radio Access Technology (RAT) dual connectivity (hereinafter referred to as "MR-DC"), which divides data between a base station (eNB) of the LIE system and the base station (gNB) of the NR system, as well as the dual connectivity of the LTE system, and simultaneously transmits and receives data by these base stations, is introduced (for example, NPL 2).

BACKGROUND TECHNIQUE DOCUMENT

Non-Patent Literature

[NPL 1]
  3GPP TS 38.300 V15.5.0 (2019-03)
[NPL 2]
  3GPP TS 37.340 V15.5.0 (2019-03)

SUMMARY OF INVENTION

Problem to be Solved by the Invention

At the time of an occurrence of a connection failure (SCG Failure: Secondary Cell Group Failure) in dual connectivity in an NR system and an LTE system, a "SCGFailureInformation" message is transmitted from a terminal to a base station. However, because the "SCGFailureInformation" message does not contain information indicating an area where the failure has occurred, it is not possible for a network to identity the area where the failure has occurred.

The present invention is provided in view of the above points and is intended to report, to the network, information of the location where the failure occurs in the dual connectivity implemented in the radio communication system.

Means for Solving the Problem

According to the disclosed technique, provided is a terminal including a reception unit configured to receive, from a base station that is a master node, a first message to configure communications with a master cell group and a secondary cell group, a communication unit configured to perform the communications with the master cell group and the secondary cell group that are configured based on the first message, a control unit configured to detect an occurrence of a failure in communications with the secondary cell group, and a transmission unit configured to transmit, in a case where the control unit detects the occurrence of the failure in the communications with the secondary cell group, a second message including information indicating the occurrence of the failure in the secondary cell group, wherein the control unit includes location information in the second message in a case where the first message is configured to have information indicating that the location information is to be included in the second message.

Effect of the Invention

According to the disclosed technique, information about the location where the failure occurs can be reported to the network in the dual connectivity implemented in the radio communication system.

BRIEF DESCRIPTION OF DRAWINGS

FIG. 6 is a diagram illustrating an example (1) of a specification modification according to the embodiment of the present invention.

FIG. 7 illustrates an example (2) of a specification modification according to the embodiment of the present invention.

FIG. 8 illustrates an example (3) of a specification modification according to the embodiment of the present invention.

FIG. 9 illustrates an example (4) of a specification modification according to the embodiment of the present invention.

FIG. 10 is a diagram illustrating an example (5) of a specification modification according to the embodiment of the present invention.

FIG. 12 is a diagram illustrating an example (7) of a specification modification according to the embodiment of the present invention.

FIG. 13 illustrates an example (8) of a specification modification according to the embodiment of the present invention.

DETAILED DESCRIPTION OF THE PREFERRED EMBODIMENT

Hereinafter, embodiments of the present invention will be described with reference to the drawings. The embodiment described below is an example, and the embodiment to which the present invention is applied is not limited to the following embodiment.

In operating the radio communication system according to the embodiment of the present invention, an existing technique is appropriately used. However, the existing technique is, for example, an existing LTE, but is not limited to an existing LTE. The term "LTE" as used herein shall also have a broad meaning, including LTE-Advanced and a later form (e.g., NR) of LTE-Advanced, unless otherwise indicated.

The embodiments of the present invention described below use the terms SS (Synchronization Signal), PSS (Primary SS), SSS (Secondary SS), PBCH (Physical broadcast channel), PRACH (Physical random access channel), and the like used in existing LTEs. This is for convenience of description and may be referred to by other names as similar signals, functions, and the like. The above terms in NR correspond to NR-SS, NR-PSS, NR-SSS, NR-PBCH, NR-PRACH, and the like. However, the signal used for NR is not always specified as "NR-".

In the embodiment of the present invention, the duplex method may be a TDD (Time Division Duplex) method, an FDD (Frequency Division Duplex) method, or any other method (e.g., Flexible Duplex, etc.).

Further, in an embodiment of the present invention, expression, radio (wireless) parameters are "configured (set)" may mean that a predetermined value is pre-configured, or may mean that a radio parameter indicated by the base station or the terminal 20 is configured.

Figure 1:
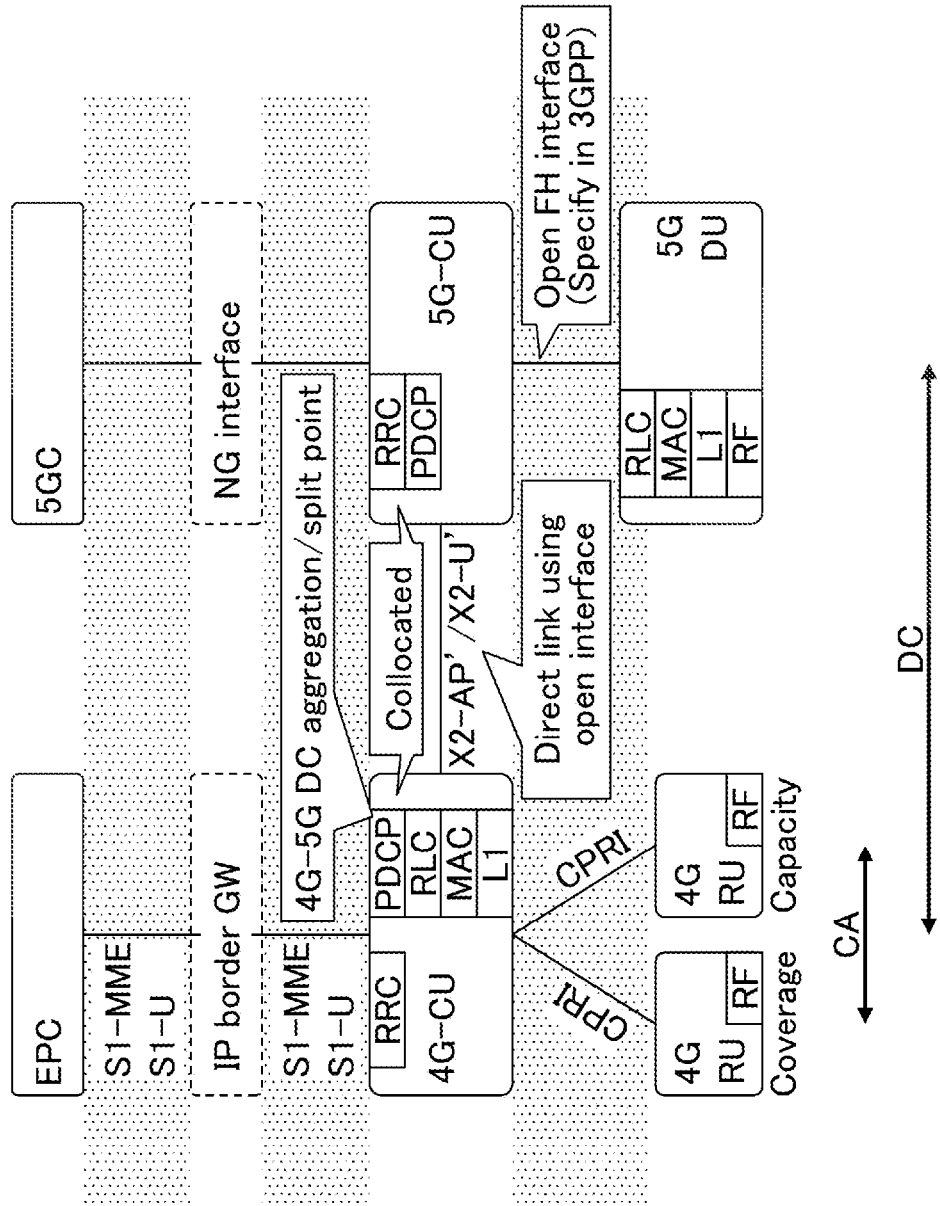
FIG. 1 is a diagram illustrating an example the configuration of a network architecture according to an embodiment of the present invention.

FIG. 1 is a diagram illustrating a configuration example of a network architecture according to the embodiment of the present invention. As illustrated in FIG. 1, a radio network architecture in an embodiment of the present invention includes 4G-CU, 4G-RU (Remote Unit, remote radio station), EPC (Evolved Packet Core), and the like on the LTE-Advanced side. A radio network architecture in the embodiment of the present invention includes 5G-CU, 5G-DU, etc., at 5G side.

As illustrated in FIG. 1, the 4G-CU includes layers up to the RRC (Radio Resource Control), PDCP (Packet Data Convergence Protocol), RLC (Radio Link Control), MAC (Medium Access Control), and L1 (Layer 1, PHY layer or physical layer) and is connected to the 4G-RU via CPRI (Common Public Radio Interface). A network node containing 4G-CU and 4G-RU is referred to as eNB.

On the 5G side, on the other hand, as illustrated in FIG. 1, the 5G-CU includes an PRC layer, is connected to a 5G-DU via FH (Flonthaul) interface, and is connected to a 5GC (5G Core Network) via an NG interface (NG interface). Further, the 5G-CU is connected to 4G-CU via an X2 interface. The PDCP layer in the 4G-CU is the coupling or separation point for performing 4G-5G Dual Connectivity (DC), i.e., E-UTRA-NR Dual Connectivity (EN-DC). A network node containing 5G-CU and 5G-DU are referred to as gNB. The 5G-CU may also be referred to as gNB-CU, and the 5G-DU may be referred to as gNB-DU.

As illustrated in FIG. 1, a CA (Carrier Aggregation) is performed between 4G and RU, and DC is performed between 4G-RU and 5G-DU. Not illustrated, a UE (User Equipment) is wirelessly connected via a 4G-RU or 5G-DU RF to transmit and receive packets.

FIG. 1 illustrates a radio network architecture for DC of LTE-NR, i.e., EN-DC (E-UTRA-NR Dual Connectivity). However, a similar radio network architecture may be used when the 4G-CU is separated into CU-DU or when the NR standalone operation is performed. When the 4G-CU is separated into CU-DU, the functions related to the RRC layer and the PDCP layer may be transferred to the 4G-CU and the RLC layer or lower may be included in the 4G-DU. The CPRI data rate may be reduced by CU-DU separation.

A plurality of 5G-DUs may be connected to the 5G-CU. Also, MR-DC (NR-NR Dual Connectivity) may be performed by connecting a UE to a plurality of 5G-CUs, or NR-DC may be performed by connecting the UE to the plurality of 5G-DUs and the single 5G-CU. The 5G-CU may be connected directly to the EPC without the 4G-CU, or the 4G-CU may be connected directly to the 5GC without 5G-CU.

Figure 2:
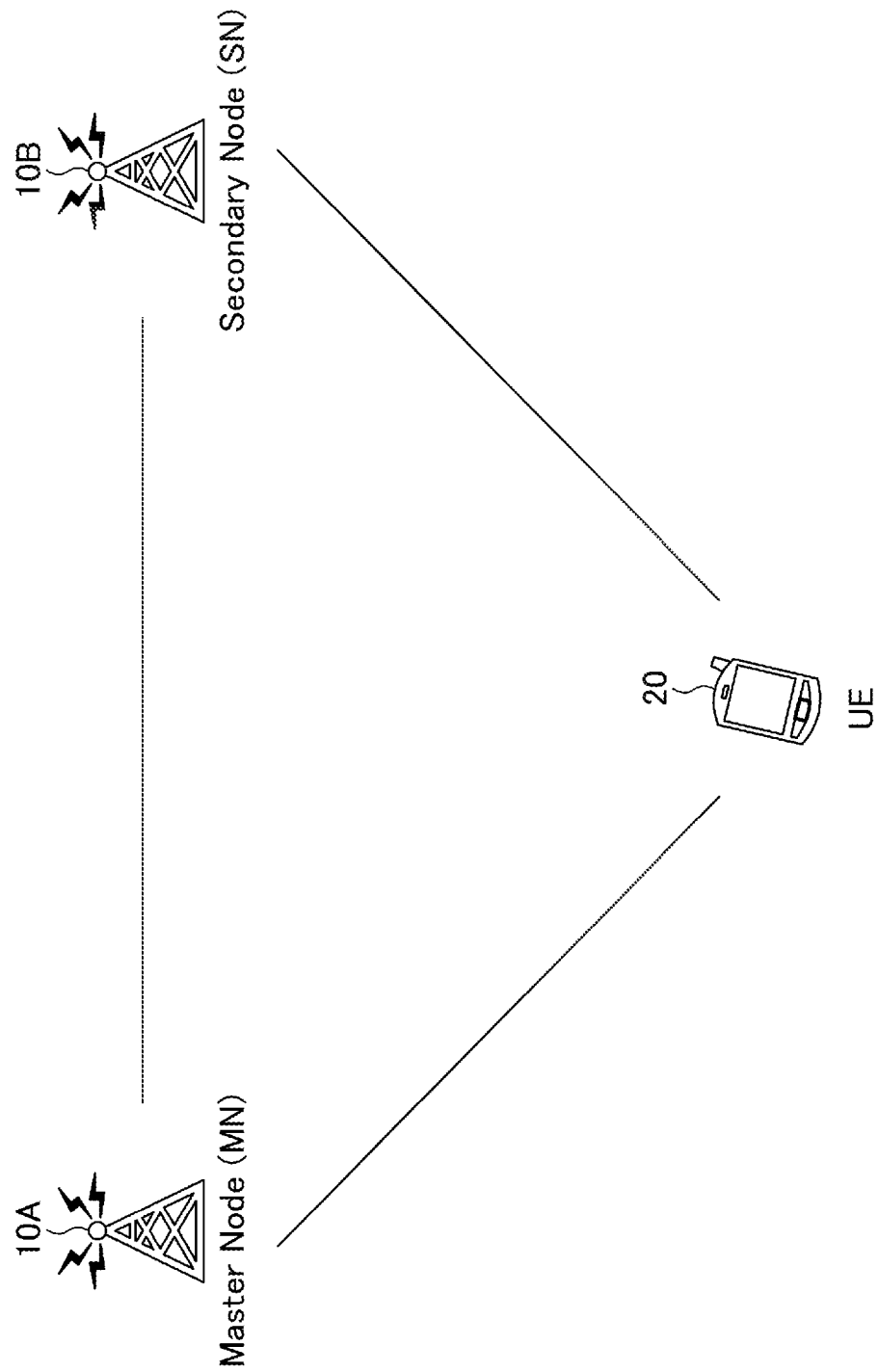
FIG. 2 is a diagram illustrating an example of the configuration of a radio communication system according to the embodiment of the present invention.

FIG. 2 is a diagram illustrating a configuration example of the radio communication system according to the embodiment of the present invention. FIG. 2 is a schematic diagram illustrating the radio communication system for MR-DC (Multi-RAT Dual Connectivity).

As illustrated in FIG. 2, the terminal 20 communicates with a base station 10A provided by the NR system and a base station 10B provided by the NR system, which may be referred to as the "base station 10" (hereafter, if the base station 10A and the base station 10B are not distinguished). The terminal 20 also supports NR-NR dual connectivity, or NR-DC, in which the base station 10A is a master node (hereinafter referred to as "MN") and base station 10B is a secondary node (hereinafter referred to as "SN"). The terminal 20 may simultaneously utilize a plurality of component carriers provided by the base station 10A which is the master node and the base station 10B which is the secondary node to perform simultaneous transmission or reception with the base station 10A which is the master node and the base station 10B which is the secondary node. Cells belonging to a master node may be called a master cell group, and cells belonging to a secondary node may be called a secondary cell group.

As also illustrated in FIG. 2, the terminal 20 may communicate with the base station 10A provided by the LTE system and the base station 10B provided by the NR system. The terminal 20 may also support LTE-NR dual connectivity that uses the base station 10A as the MN and the base station 10B as the SN, namely, EN-DC. The terminal 20 may simultaneously utilize a plurality of component carriers provided by the base station 10A which is the master node and the base station 10B which is the secondary node to perform simultaneous transmission or reception with the base station 10A which is the master node and the base station 10B which is the secondary node.

As also illustrated in FIG. 2, the terminal 20 may communicate with the base station 10A provided by the NR system and the base station 10B provided by the LTE system. The terminal 20 may also support NR-LTE dual connectivity that uses the base station 10A as the MN and the base station 10B as the SN, namely, NE-DC (NR-E-UTRA Dual Connectivity). The terminal 20 may simultaneously utilize a plurality of component carriers provided by the base station 10A which is the master node and the base station 10B which is the secondary node to perform simultaneous transmission or reception with the base station 10A which is the master node and the base station 10B which is the secondary node.

As also illustrated in FIG. 2, the terminal 20 may communicate with the base station 10A provided by the NR system and the base station 10B provided by the NR system. The terminal 20 may also support NR-NR dual connectivity that uses the base station 10A as the MN and the base station 10B as the SN, namely, NR-DC. The terminal 20 may simultaneously utilize a plurality of component carriers provided by the base station 10A which is the master node and the base station 10B which is the secondary node to perform simultaneous transmission or reception with the base station 10A which is the master node and the base station 10B which is the secondary node.

As also illustrated in FIG. 2, the terminal 20 may communicate with the base station 10A provided the LTE system and the base station 10B provided by the LTE system. The terminal 20 may also support LTE-LTE dual connectivity that uses the base station 10A as the MN and the base station 10B as the SN, namely LTE-DC. The terminal 20 may simultaneously utilize a plurality of component carriers provided by the base station 10A which is the master node and the base station 10B which is the secondary node to perform simultaneous transmission or reception with the base station 10A which is the master node and the base station 10B which is the secondary node.

In the MR-DC, when a connection failure (SCG Failure: Secondary Cell Group Failure) in the secondary cell group is detected in the terminal 20, a "SCGFailureInformation" message is transmitted from the terminal 20 to the base station 10 which is the master node. The "SCGFailureInformation" message includes the cause of the failure, the measurement result of the serving cell when the failure occurs, and the measurement result of an adjacent cell, if any.

Information obtained by the network using the "SCGFailureInformation" message can be used to improve the quality of the area on the network side. However, because no information is acquired to indicate the area in which the "SCGFailure" has occurred, the network cannot specifically identify the area where the failure has occurred.

Therefore, when MR-DC is configured by using a "RRCReconfiguration" message or "RRCConnectionReconfiguration" message, information is configured. The information indicates that location information and velocity information, if the velocity information is obtainable, are to be included in "SCGFailureInformation" message. In a case where SCG Failure occurs, the terminal 20, which has been configured to include in the "SCGFailureInformation" the location information and the velocity information, if the velocity information is obtainable, reports to the network by including the location information and the velocity information, if the velocity information is obtainable, in the "SCGFailureInformation". The report is applicable to EN-DC and NE-DC being MR-DC, and also to NR-DC and LTE-DC.

Figure 3:
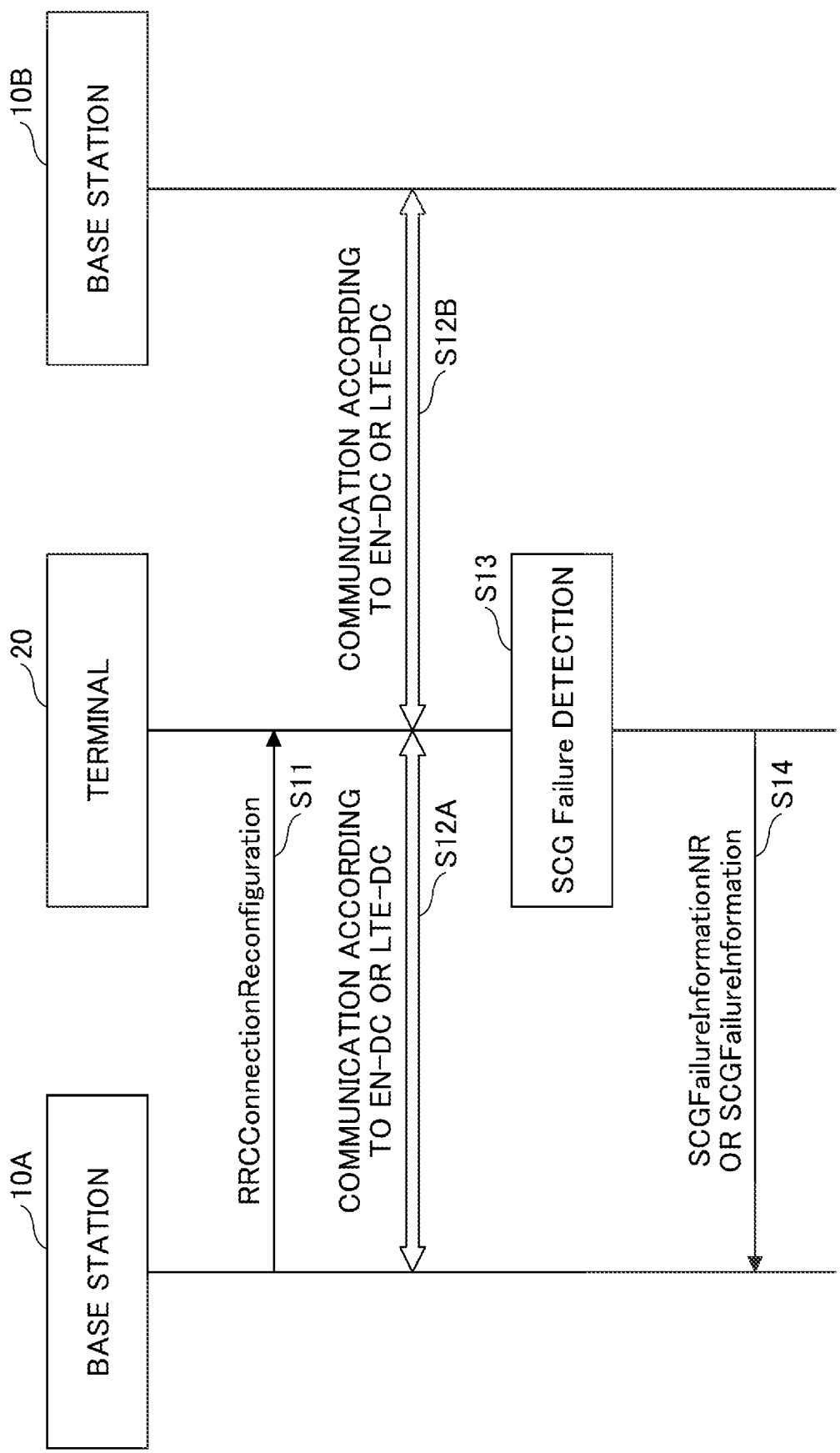
FIG. 3 is a sequence diagram for explaining an operation example (1) according to the embodiment the present invention.

FIG. 3 is a sequence diagram for explaining an operation example (1) according to an embodiment of the present invention. FIG. 3 illustrates an example of an operation when the master node is the base station 10A of the LTE. The secondary node is a base station 10B of NR or LTE. That is, the diagram corresponds to an example of operation in the case of EN-DC or LTE-DC.

In step S11, the base station 10A of the LTE that is the master node transmits to the terminal 20 a "RRCConnectionReconfiguration" message that includes a configuration for including the location information and for including the velocity information, if the velocity information is obtainable, in the "SCGFailureInformation" message, and that includes a configuration for executing the DC. Subsequently, in steps S12A and S12B, communication according to EN-DC or LTE-DC is performed by the base station 10A, the terminal 20, and the base station 10B. If the base station 10B is NR, EN-DC is executed. If the base station 10B is LTE, then LTE-DC is executed.

In step S13, the terminal 20 detects SCG Failure in communications with the base station 10B. Subsequently, the terminal 20 reports to the network based on the configuration of the RRCConnectionReconfiguration received in step S11, by including the location information and the velocity information, if the velocity information is obtainable, in "SCGFailureInformationNR" or "SCGFailureInformation". When the base station 10B is NR, a "SCGFailureInformationNR" is transmitted. When the base station 10B is an LTE, "SCGFailureInformation" is transmitted.

Figure 4:
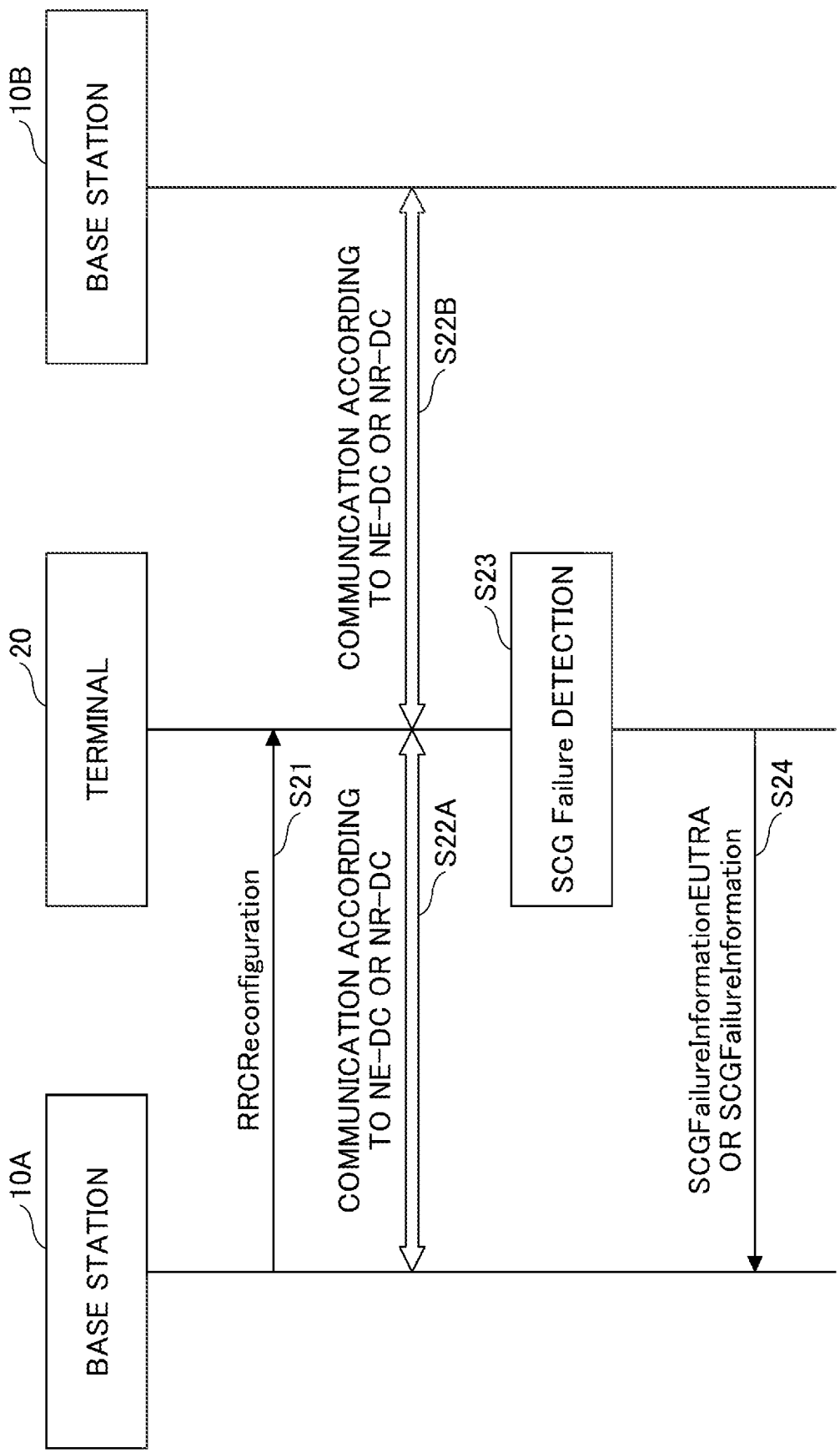
FIG. 4 is a sequence diagram for explaining an operation example according to the embodiment the present invention.

FIG. 4 is a sequence diagram for explaining an operation example (2) according an embodiment of the present invention. FIG. 4 illustrates an example of an operation in which the master node is the base station 10A of the NR. The secondary node is the base station 10B of the LTE or NR. That is, the diagram corresponds to an operation example in the case of NE-DC or NR-DC.

In step S21, the base station 10A of the NR, which is the master node, transmits to the terminal 20 a "RRCReconfiguration" message that includes a configuration for including location information and velocity information, if the velocity information is obtainable, in the "SCGFailureInformation", and a configuration for executing DC. Subsequently, in steps S22A and S22B, communications according to NE-DC or NR-DC is performed by the base station 10A, the terminal 20, and the base station 10B. If the base station 10B is LTD, NE-DC is executed. If the base station 10B is NR, NR-DC is executed.

In step S23, the terminal 20 detects SCG Failure in communications with the base station 10B. Subsequently, the terminal 20 reports to the network, by including the location information and the velocity information, if the velocity information is obtainable, in "SCGFailureInformationEUTRA" or "SCGFailureInformation", based on the configuration of the RRCReconfiguration received in step 311. When the base station 10B is LTE, "SCGFailureInformationEUTRA" is transmitted. When the base station 10B is NR, "SCGFailureInformation" is transmitted.

Figure 5:
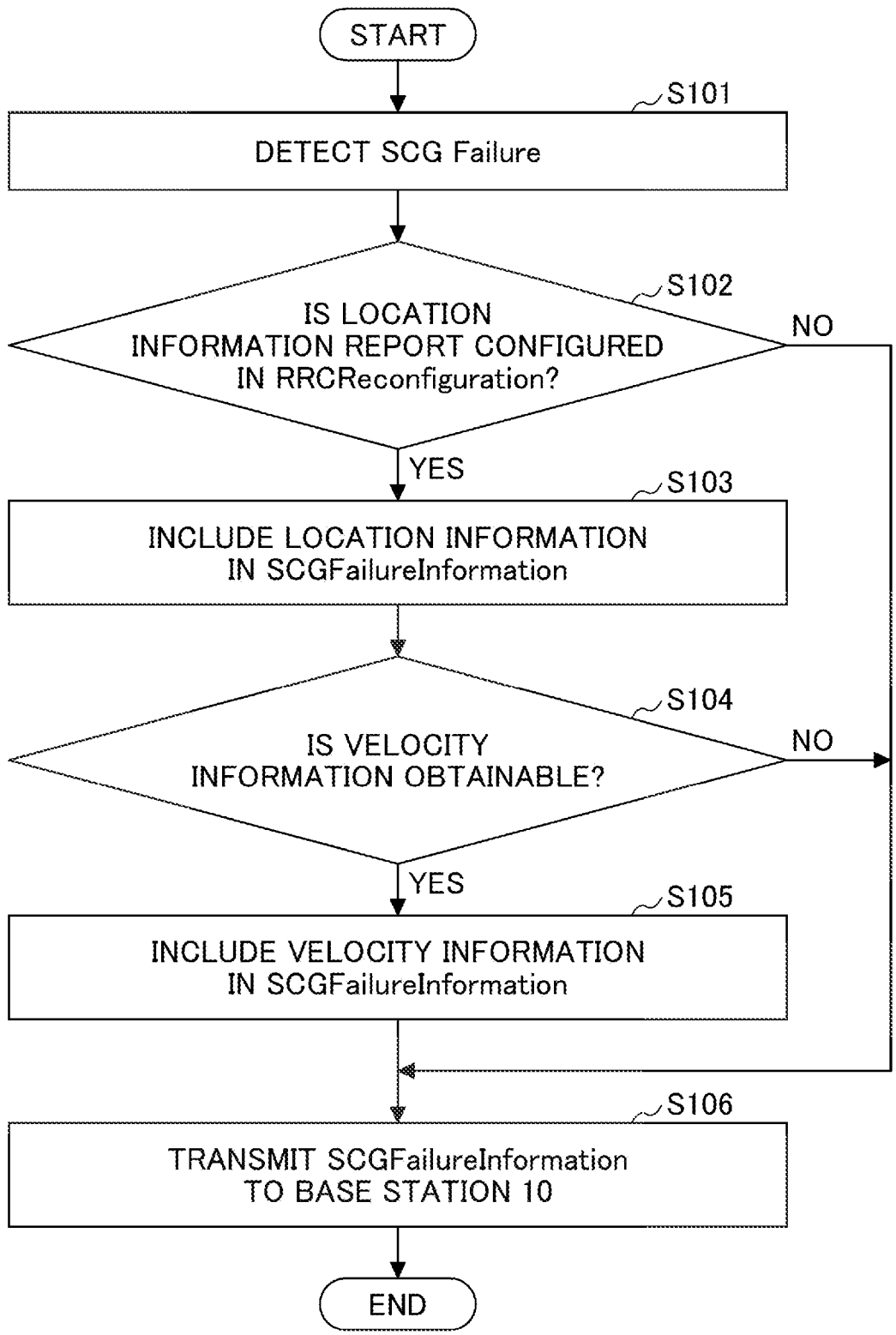
FIG. 5 is a flowchart illustrating an operation example according to the embodiment of the present invention.

FIG. 5 is a flowchart illustrating an example of an operation according to an embodiment of the present invention. Details of an operation example corresponding to steps S13 and S14 illustrated in FIG. 3 or to steps S23 and S24 illustrated in FIG. 4 will be described with reference to FIG. 5.

In step S101, the terminal 20 detects SCG Failure. Subsequently, the terminal 20 determines whether the location information report of the SCG Failure is configured in the "RRCReconfiguration" message or the "RRCConnectionReconfiguration" message (S102). When the location information report of SCG Failure is configured (YES of S102), the process goes to step S103, and when the location information report of SCG Failure is not configured (NO of S102), the process goes to step S106.

In step S103, the terminal 20 includes location information in "SCGFailureInformation". Subsequently, the terminal 20 determines whether the velocity information is obtainable (S104). When the velocity information can be acquired (YES of S104), the process proceeds to step S105, and when the velocity formation is not obtainable (NO of S104), the process proceeds to step S106.

In step S105, the terminal 20 includes velocity information in "SCGFailureInformation". In step S106, the terminal 20 transmits "SCGFailureInformation" to the base station 10.

FIG. 6 is a diagram illustrating an example (1) of a specification modification according to an embodiment of the present invention. The information element "obtainLocationInfoViaSCG-Failure-r16" in LTE RRC illustrated in FIG. 6 is an information element that configures the reporting of the location information at the time of SCG Failure. The "obtainLocationInfoViaSCG-Failure-r16" is included in "OtherConfig", and the "OtherConfig" is included in the "RRCConnectionReconfiguration" that is transmitted from the base station 10 to the terminal 20.

FIG. 7 is a diagram illustrating an example (2) of a specification modification according to an embodiment of the present invention. The information element "SCGFailureInformationNR" in the LTE RRC illustrated in FIG. 7 is transmitted from the terminal 20 to the base station 10 when the SCG Failure is detected in EN-DC. As illustrated in FIG. 7, "SCGFailureInformationNR" includes "locationInfo-r16" which indicates location information.

FIG. 8 is a diagram illustrating an example (3) of a specification modification according to an embodiment of the present invention. The information element "SCGFailureInformation" in the LTE RRC illustrated in FIG. 8 is transmitted from the terminal 20 to the base station 10 when the SCG Failure is detected in the LTE-DC. As illustrated in FIG. 8, "SCGFailureInformation" includes "locationInfo-r16" which indicates location information.

FIG. 9 is a diagram illustrating an example (4) of a specification modification according to an embodiment of the present invention. The information element "LocationInfo" in the LTE RRC illustrated in FIG. 9 includes location information and, optional velocity information.

The location information is indicated, for example, by any one of a)-g) below.
   a) "ellipsoid-Point-r10" is information including longitude and latitude indicating a point on the ellipsoid.
   b) "ellipsoidPointWithAltitude-r10" is information that includes longitude and latitude indicating a point on the ellipsoid, and that also includes altitude.
   c) "ellipsoidPointWithUncertaintyCircle-r11" is information that includes longitude and latitude indicating a point on the ellipsoid, and that also includes a predetermined distance r indicating a circle.
   d) "ellipsoidPointWithUncertaintyEllipse-r11" is information that includes longitude and latitude indicating a point on the ellipsoid, and that also includes a parameter indicating an ellipse.
   e) "ellipsoidPointWithAltitudeAndUncertaintyEllipsoid-r11" is information that includes longitude and latitude indicating a point on the ellipsoid, and that also includes altitude and a parameter that indicates an ellipse.
   f) "ellipsoidArc-r11" is information indicating an arc having a predetermined width on the ellipsoid.
   g) "polygon-r11" is information indicating a polygon consisting of straight lines connecting three or more points indicating latitude and longitude.

The velocity information includes "horizontalVelocity-r10". The velocity information may further include "verticalVelocityInfo-r15". The "horizontalVelocity-r10" is information indicating the velocity on the ellipsoidal surface. The "verticalVelocity-r15" is information indicating vertical velocity, and "verticalVelocityAndUncertainty-r15" is information indicating vertical velocity and information defining a range of a velocity vector. "gnss-TOD-msec" indicates the time according to GNSS (Global Navigation Satellite System).

FIG. 10 is a diagram illustrating an example (5) of a specification modification according to an embodiment of the present invention. The information element "obtainLocationInfoViaSCG-Failure-r16" in the NR RRC illustrated in FIG. 6 is an information element that configures the reporting of the location information at the time of SCG Failure. The "obtainLocationInfoViaSCG-Failure-r16" is included in "OtherConfig" and the "OtherConfig" is included in "RRCReconfiguration" that is transmitted from the base station 10 to the terminal 20.

Figure 11:
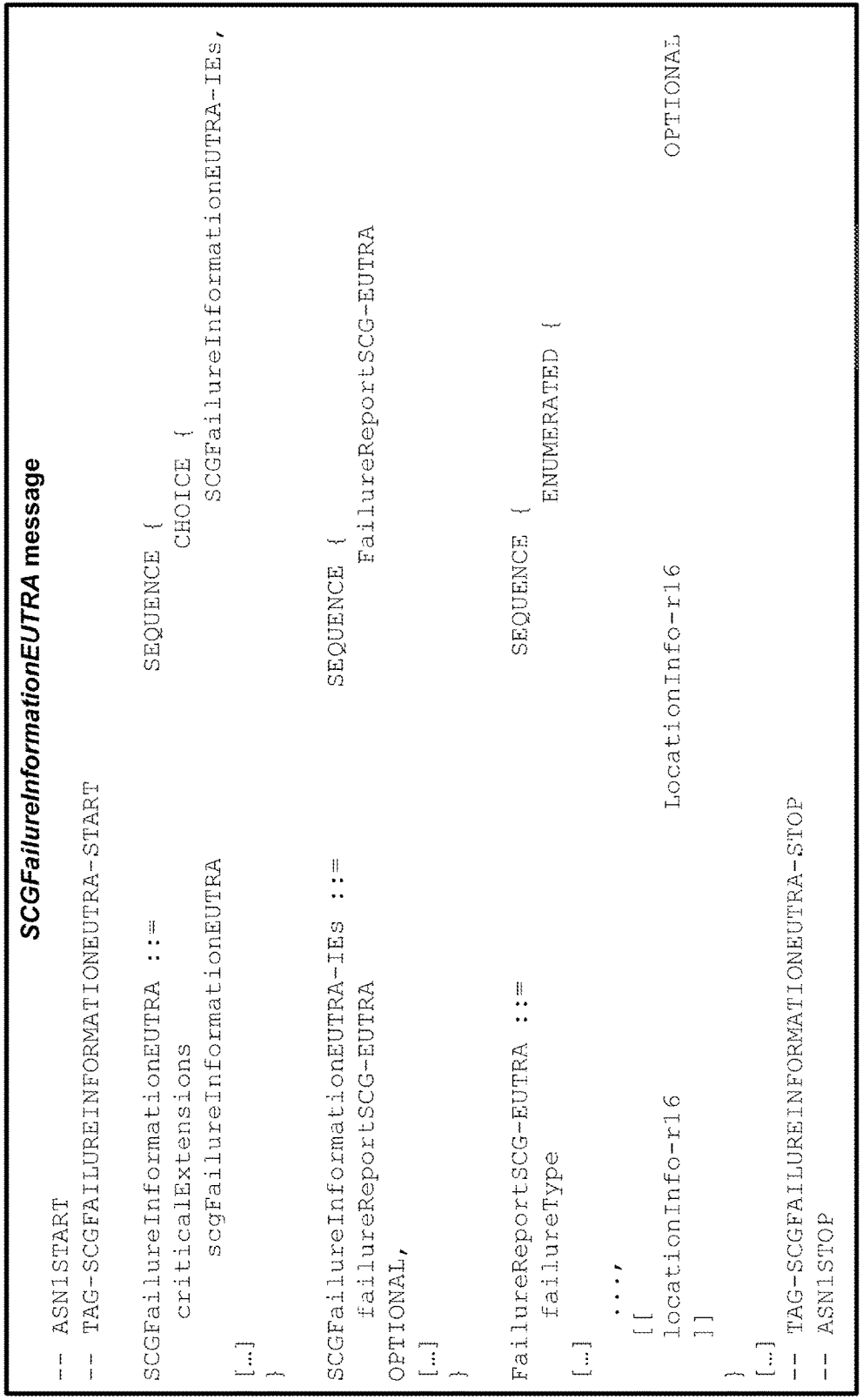
FIG. 11 illustrates an example (6) of a specification modification according to the embodiment of the present invention.

FIG. 11 is a diagram illustrating an example (6) of a specification modification according to an embodiment of the present invention. The information element "SCGFailureInformationEUTRA" in the NR RRC illustrated in FIG. 11 is transmitted from the terminal 20 to the base station 10 when the SCG Failure is detected in the NE-DC. As illustrated in FIG. 11, "SCGFailureInformationEUTRA" includes "locationInfo-r16" which indicates location information.

FIG. 12 is a diagram illustrating an example (7) of a specification modification according to an embodiment of the present invention. The information element "SCGFailureInformation" in the NR RRC illustrated in FIG. 12 is transmitted from the terminal 20 to the base station 10 when SCG Failure is detected in the NR-DC. As illustrated in FIG. 12, "SCGFailureInformation" includes "locationInfo-r16" which indicates location information.

FIG. 13 is a diagram illustrating an example (8) of the specification modification according to an embodiment of the present invention. The information element "LocationInfo" in NR RRC illustrated in FIG. 13 includes the location information and, optionally, velocity information.

The location information is indicated, for example, by any one of a)-g) below.
   a) "ellipsoid-Point-r16" is information including longitude and latitude indicating a point on the ellipsoid.
   b) "ellipsoidPointWithAltitude-r16" is information that includes longitude and latitude indicating a point on the ellipsoid, and that also includes altitude.
   c) "ellipsoidPointWithUncertaintyCircle-r11" is information that includes longitude and latitude indicating a point on the ellipsoid, and that also includes a predetermined distance r indicating a circle.
   d) "ellipsoidPointWithUncertaintyEllipse-r11" is information that includes longitude and latitude indicating a point on the ellipsoid, and that also includes a parameter indicating an ellipse.
   e) "ellipsoidPointWithAltitudeAndUncertaintyEllipsoid-r11" is information that includes longitude and latitude indicating a point on the ellipsoid, and that also includes altitude and a parameter that indicates an ellipse.
   f) "ellipsoidArc-r11" is information indicating an arc having a predetermined width on the ellipsoid.
   g) "polygon-r11" is information indicating a polygon consisting of straight lines connecting three or more points indicating latitude and longitude.

The velocity information includes "horizontalVelocity-r16". The velocity information may further include "verticalVelocityInfo-r15". The "horizontalVelocity-r16" is information indicating the velocity on the ellipsoidal surface. The "verticalVelocity-r15" is information indicating vertical velocity, and "verticalVelocityAndUncertainty-r15" is information indicating vertical velocity and information defining a range of a velocity vector. "gnss-TOD-msec-r16" indicates the time according to GNSS (Global Navigation Satellite System).

According to the above-described embodiment, the network can obtain the location information of the terminal 20 when SCG Failure occurs, so that an area with a quality problem can be geographically identified in detail.

That is, in the dual connectivity executed in a radio communication system, information about the location where the failure has occurred can be reported to the network.

(Apparatus Configuration)

Next, a functional configuration example of the base station 10 and the terminal 20 for performing the processes and operations described above will be described. The base station 10 and terminal 20 include functions for implementing the embodiments described above. However, each of the base stations 10 and the terminal 20 may alternatively include only some of the functions in the embodiment.

<Base Station 10>

Figure 14:
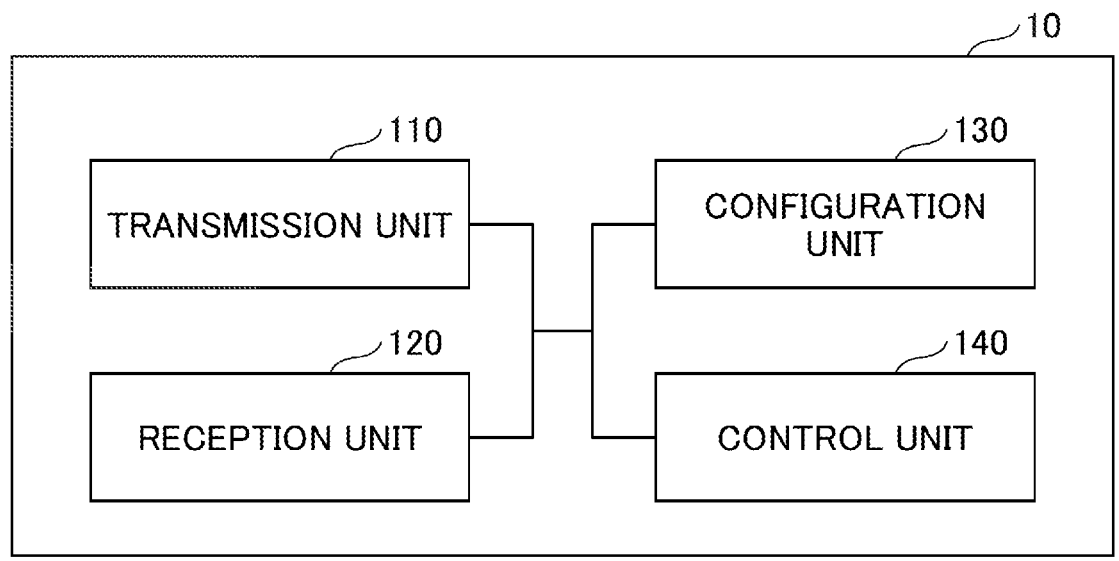
FIG. 14 is a diagram illustrating an example a functional configuration of a base station 10 according to the embodiment of the present invention.

FIG. 14 is a diagram illustrating an example of the functional configuration of the base station 10 according to an embodiment of the present invention. As illustrated in FIG. 14, the base station 10 includes a transmission unit 110, a reception unit 120, a configuration unit 130, and a control unit 140. The functional configuration illustrated in FIG. 14 is only one example. If the operation according to the embodiments of the present invention can be performed, the functional category and the name of the functional unit may be any category and any name.

The transmission unit 110 includes a function for generating a signal to be transmitted to the terminal 20 side and transmitting the signal wirelessly. The transmission unit 110 transmits a message exchanged between network nodes to another network node. The reception unit 120 includes a function for receiving various signals transmitted from the terminal 20 and acquiring, for example, information of a higher layer from the received signals. The transmission unit 110 has a function to transmit NR-PSS, NR-SSS, NR-PBCH, DL/UL control signals, or the like to the terminal 20. The reception unit 120 receives a message exchanged between network nodes from another network node.

The configuration unit 130 stores the preset configuration information and various configuration information to be transmitted to the terminal 20. The contents of the configuration information are, for example, configuration information related to dual connectivity, location information of the terminal 20, and configuration information related to the velocity information acquisition.

As described in the embodiment, the control unit 140 performs a control pertaining to transmission and reception including the dual connectivity with the terminal 20 and a control pertaining to processing of the location information and velocity information received from the terminal 20. The control unit 140 performs a control pertaining to a message creation process in which the location information at the time of the SCG failure and the optional velocity information are requested to the terminal 20. A function unit related to the signal transmission in the control unit 140 may be included in the transmission unit 110, and the function unit related to a signal reception in the control unit 140 may be included in the reception unit 120.

<Terminal 20>

Figure 15:
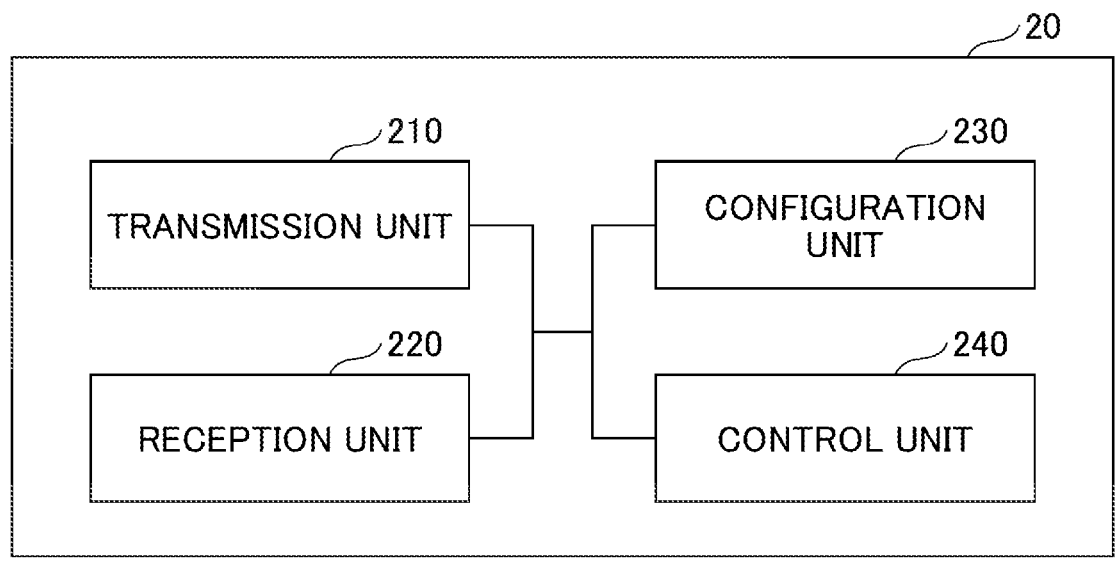
FIG. 15 illustrates an example of a functional configuration of a terminal 20 according to the embodiment of the present invention.

FIG. 15 is a diagram illustrating an example of a functional configuration of the terminal 20 according to the embodiment of the present invention.

As illustrated in FIG. 15, the terminal 20 includes a transmission unit 210, a reception unit 220, a configuration unit 230, and a control unit 240. The functional configuration illustrated in FIG. 15 is only one example. If the operation according to the embodiment of the present invention can be performed, the functional category and the name of the functional unit may be any one.

The transmission unit 210 creates a transmission signal from transmission data and wirelessly transmits the transmission signal.

The reception unit 220 receives various signals wirelessly and acquires a signal in a higher layer using a received signal from the physical layer. The reception unit 220 has a function to receive NR-PSS, NR-SSS, NR-PBCH, DL/UL/SL control signals or the like transmitted from the base station 10. For example, the transmission unit 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), and the like to the other terminal 20 as D2D (Device to Device) communication, and the reception unit 120 receives PSCCH, PSSCH, PSDCH, PSBCH, and the like from the other terminal 20.

The configuration unit 230 stores various configuration information received from the base station 10 by the reception unit 220. The configuration unit 230 also stores preset configuration information. The contents of the configuration information are, for example, configuration information related to the dual connectivity and configuration information related to acquisition of the location information acquisition.

The control unit 240 performs a transmission and reception control, including dual connectivity, as described in the embodiment. The control unit 240 performs a control pertaining to the acquisition process of the location information and the velocity information. The control unit 240 performs control pertaining to a message creation process including location information at the time of SCG failure and optional velocity information. A function unit related to the signal transmission in the control unit 240 may be included in the transmission unit 210, and a function unit related to the signal reception in the control unit 240 may be included in the reception unit 220.

(Hardware Configuration)

Block diagrams (FIGS. 14 and 15) used in the description of the above embodiment illustrate blocks of functional units. These functional blocks (components) are implemented by any combination of hardware and/or software. In addition, the implementation method of each functional block is not particularly limited. That is, each functional block may be implemented using a single device that is physically or logically combined, or two or more devices that are physically or logically separated may be directly or indirectly connected (e.g., using wired, radio, etc.) and implemented using these multiple devices. The functional block may be implemented by combining software with one device or multiple devices.

Functions include, but are not limited to, decision, determination, judgement, calculation, operation, processing, derivation, research, search, verification, reception, transmission, output, access, resolution, selection, choice, establishment, comparison, assumption, expectation, and deeming, broadcasting, notifying, communicating, forwarding configuring, reconfiguring, allocating, mapping, assigning, and so on. For example, a functional block (component) that functions to transmit is called a transmission unit or a transmitter. In either case, as described above, the realization method is not particularly limited.

Figure 16:
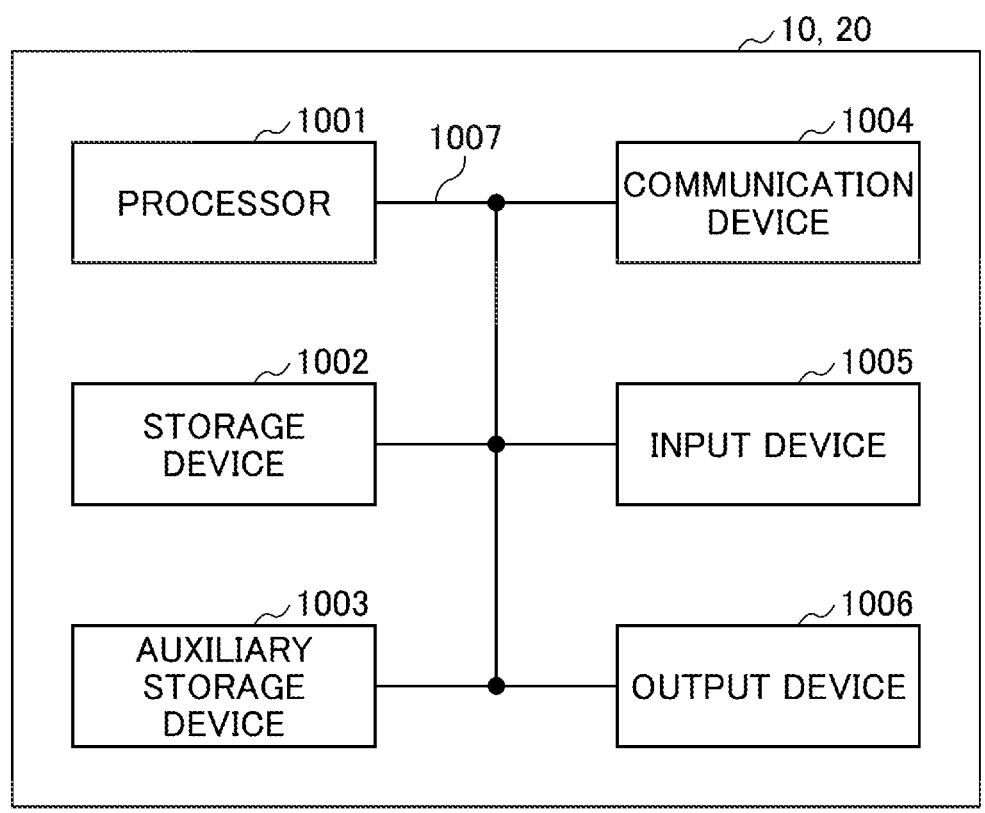
FIG. 16 illustrates an example of the hardware configuration of the base station 10 or the terminal 20 according to the embodiment of the present invention.

For example, the base station 10, terminal 20, etc., according to the embodiment of the present disclosure may function as a computer for processing the radio communication method of the present disclosure. FIG. 16 is a diagram illustrating an example of the hardware configuration of the base station 10 and the terminal 20 according to the embodiment of the present disclosure.

The base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "apparatus" can be read as a circuit, device, unit, etc. The hardware configuration of the base station 10 and terminal 20 may be configured to include one or multiple of the devices illustrated in the figures or may be configured without some of the devices.

The functions in the base station 10 and the terminal 20 are implemented by performing operations by the processor 1001 by reading predetermined software (programs) on hardware such as the processor 1001 and the storage device 1002, and controlling communications by the communication device 1004 and controlling at least one of reading and writing of data in the storage device 1002 and the auxiliary storage device 1003.

The processor 1001 operates, for example, an operating system to control the entire computer. The processor 1001 may be formed of a central processing unit (CPU) including an interface with peripheral devices, a control device, an operation device, a register, and the like. For example, the above-described control unit 140, control unit 240, and the like may be implemented by the processor 1001.

The processor 1001 reads out a program (program code), software module, data, or the like from at least one of the auxiliary storage device 1003 and the communication device 1004 to the storage device 1002 and performs various processing in accordance with the above. As a program, a program that causes a computer to execute at least a part of operation described in the above-described embodiment is used. For example, the control unit 140 of the base station 10 illustrated in FIG. 14 may be stored in the storage device 1002 and implemented by a control program executed by the processor 1001. For example, the control unit 240 of the terminal 20 illustrated in FIG. 15 may be stored in the storage device 1002 and implemented by a control program operated by the processor 1001. Although the foregoing processes have been described and executed by one processor 1001, they may be executed simultaneously or sequentially by two or more processors 1001. The processor 1001 may be implemented by one or multiple chips. The program may be transmitted from the network via a telecommunication line.

The storage device 1002 is a computer-readable recording medium and may be formed of at least one of, for example, ROM (Read Only Memory), EPROM (Erasable Programmable ROM), EEPROM (Electrically Erasable Programmable ROM), RAM (Random Access Memory), and the like. The storage device 1002 may be referred to as a register, cache, main memory (storage device), or the like. The storage device 1002 can store programs (program codes), software modules, etc., executable to implement the communication method according to the embodiment of the present disclosure.

The auxiliary storage device 1003 is a computer-readable recording medium and may include at least one of an optical disk such as a CD-ROM (Compact Disc ROM), a hard disk drive, a flexible disk, a magneto-optical disk (e.g., a compact disk, a digital versatile disk, a Blu-ray ("Blu-ray" is a registered trademark) disk), a smart card, a flash memory (e.g., card, a stick, a key-drive), a floppy ("floppy" is a registered trademark) disk, a magnetic strip, and the like. The storage medium described above may be, for example, a database, server, or other suitable medium that includes at least one of the storage device 1002 and the auxiliary storage device 1003.

The communication device 1004 is hardware (transmitting/receiving device) for performing communication between computers via at least one of a wired network and a radio network, and is also referred to as a network device, a network controller, a network card, a communication module, or the like. The communication device 1004 may include a high frequency switch, duplexer, filter, frequency synthesizer, or the like, for example, to implement at least one of a frequency division duplex (FDD) and a time division duplex (TDD). For example, a transmitting/receiving antenna, an amplifier unit, a transmitting and reception unit, a transmission line interface, and the like may be implemented by the communication device 1004. The transmitting and reception unit may be physically or logically isolated implementations of the transmitters and receivers.

The input device 1005 is a device (e.g., a keyboard, mouse, microphone, switch, button, sensor, etc.) that accepts an external input. Output device 1006 is an output device (e.g., a display speaker, LED lamp, etc.) that implements an external output. The input device 1005 and the output device 1006 may have an integral configuration (for example, a touch panel).

Each device, such as a processor 1001 and storage device 1002, is connected by a bus 1007 for communicating information. The bus 1007 may be constructed using a single bus or may be constructed using different buses between devices.

The base station 10 and the terminal 20 may also include hardware such as a microprocessor, a digital signal processor (DSP), an ASIC (Application Specific Integrated Circuit), a PLD (Programmable Logic Device), an FPGA (Field Programmable Gate Array) and some or all of the functional blocks may be implemented the hardware. For example, the processor 1001 may be implemented using at least one of the hardware.

Summary of Embodiment

As described above, according to the embodiment of the present invention, provided is a terminal including a reception unit configured to receive, from a base station that is a master node, a first message to configure communications with a master cell group and a secondary cell group, communication unit configured to perform the communications with the master cell group and the secondary cell group that are configured based on the first message, a control unit configured to detect an occurrence of a failure in communications with the secondary cell group, and a transmission unit configured to transmit, in a case where the control unit detects the occurrence of the failure in the communications with the secondary cell group, a second message including information indicating the occurrence of the failure in the secondary cell group, wherein the control unit includes location information in the second message in a case where the first message is configured to have information indicating that the location information is to be included in the second message.

With the above configuration, the network can obtain the location information of the terminal 20 when SCG Failure occurs, so that an area with a quality problem can be geographically identified. That is, in the dual connectivity executed in the radio communication system, information about the location where the failure occurred can be reported to the network.

When information indicating that location information is to be included in the second message is configured to the first message, the transmission unit may include location information and velocity information in the second message. The configuration allows the network to obtain the location and velocity information of the terminal 20 when SCG Failure occurs, so that an area with a quality problem can be identified in detail.

As to the terminal according to claim 1, the location information is represented by any of the following a)-g):
- a) information including longitude and latitude indicating a point on an ellipsoid;
- b) information including the longitude and the latitude indicating the point on the ellipsoid, and altitude;
- c) information indicating the longitude and the latitude indicating the point on the ellipsoid, and a circle;
- d) information indicating the longitude and the latitude indicating the point on the ellipsoid, and an ellipse;
- e) information indicating the longitude and the latitude indicating the point on the ellipsoid, and the altitude and the ellipse;
- f) information indicating an arc having a width on the ellipsoid; and
- g) information indicating a polygon formed by straight lines connecting at least three points indicating latitude and longitude. The configuration allows the network to obtain the location information of the terminal 20 when SCG Failure occurs so that an area with a quality problem can be identified in detail.

As to the terminal according to claim 2, velocity information is represented by any of the following h)-j):
- h) information indicating a velocity on a surface of the ellipsoid;
- i) information indicating the velocity on the surface the ellipsoid and a velocity in a vertical direction; and
- j) Information indicating the velocity on the surface of the ellipsoid, the velocity in the vertical direction, and a velocity vector range. The configuration allows the network to obtain the velocity information of the terminal 20 at the time the SCG Failure occurred, so that an area with a quality problem can be identified in detail.

As described above, according to the embodiment of the present invention, a base station including a transmission unit configured to transmit, to a terminal, a first message for configuring communications with a master cell group and a secondary cell group, a communication unit configured to perform the communications with the terminal through the master cell group that is configured based on the first message, a reception unit configured to receive, when the terminal detects the occurrence of the failure communications with the secondary cell group, a second message including information indicating an occurrence of a failure in the secondary cell group, and a control unit configured to configure information indicating that location information is to be included in the second message, to the first message is provided.

With the above configuration, the network can obtain location information of the terminal 20 when SCG Failure occurs, so that an area with a quality problem can be identified in detail. That is, in the dual connectivity executed in a radio communication system, information about the location where the failure occurred can be reported to the network.

Supplement to Embodiment

Thus, although the embodiment of the present invention has been described, the disclosed invention is not limited to such embodiments, and various modifications, variations, alternatives, substitutions, etc. will be understood by those skilled in the art. Specific numerical examples have been used to facilitate understanding of the invention, but unless otherwise indicated, they are merely examples and any appropriate values may be used. Classification of items in the above description is not essential to the present invention, and the items described in two or more items may be used in combination as needed, or the items described in one item may be applied to the items described in another item (unless there is a conflict). The functional or processing unit boundaries in the functional block diagram do not necessarily correspond to the physical part boundaries. The operation of the plurality of functions may be performed physically by one component, or the operation of one function may be performed physically by the plurality of components. As for the processing procedure described in the embodiment, the order of the processing may be changed unless there is no conflict. For convenience of process description, the base station 10 and terminal 20 have been described using a functional block diagram, but such devices may be implemented in hardware, software, or a combination thereof. Software operated by a processor of the base station 10 in accordance with embodiments of the present invention and software operated by a processor of the terminal 20 in accordance with embodiments of the present invention may be stored in random access memory (RAM), flash memory, read only memory (ROM), EPROM, EEPROM, register, hard disk (HDD), removable disk, CD-ROM, database, server, or any other suitable storage medium.

Information may also be communicated in other ways, as well as in the mode/embodiments described in this disclosure. For example, indication of information may be implemented by physical layer signaling (e.g., DCI (Downlink Control Information), UCI (Uplink Control Information), higher layer signaling (e.g., RRC (Radio Resource Control) signaling, MAC (Medium Access Control) signaling, MIB (Master Information Block), SIB (System Information Block) other signals, or a combination thereof. Further, RRC signaling may be referred to as RRC messages, e.g., RRC Connection Setup message, RRC Connection Reconfiguration message, etc.

Each mode/embodiment described in this disclosure may be applied to at least one of the following systems, other appropriate systems, and next generation systems extended thereon: LTE (Long Term Evolution), LTE (LTE-Advanced), SUPER 3G, IMT-Advanced, 4G (4th generation mobile communication system), 5G (5th generation mobile communication system), FRA (Future Radio Access), NR (new Radio), W-CDMA ("W-CDMA" is a registered trademark), GSM ("GSM" is a registered trademark), CDMA2000 UMB (Ultra Mobile Broadband), IEEE 802.11 (Wi-Fi("Wi-Fi" is a registered trademark)), IEEE 802.16 (WiMAX("WiMAX" is a registered trademark)), IEEE 802.20 (Ultra-WideBand), and Bluetooth ("Bluetooth" is a registered trademark). Multiple systems may also be applied in combination (e.g., at least one of LTE and LTE-A combined with 5G, etc.).

The processing procedures, sequences, flowcharts, etc. of each mode/embodiment described herein may be reordered unless there is any conflict. For example, the methods described in the present disclosure are presented using exemplary sequences to present elements of the various steps and are not limited to the particular order presented.

The specific operations described herein as performed by the base station 10 may be performed by its upper node in some cases. In a network of one or multiple network nodes having a base station 10, it will be apparent that various operations performed for communication with terminal 20 may be performed by at least one of the base station 10 other network nodes other than base station 10 (e.g., but not limited to MME, S-GW, etc.). Although the above illustrates that there is only one other network node other than the base station 10, the other network nodes may be a combination of multiple other network nodes (e.g., MME and S-GW).

The information or signals described in this disclosure can be output from a higher layer (or lower) to a lower layer (or higher layer). It may be input and output through multiple network nodes.

The input and output information may be stored in a specific location (e.g., memory) or managed using management tables. Input and output information may be overwritten, updated, or added. Output information may be deleted. The input information or the like may be transmitted to another device.

The determination in this disclosure may be made by a value (0 or 1) expressed in 1 bit, by a true or false value (Boolean: true or false), or by a numerical comparison (e.g., a comparison with a predetermined value).

Whether referred to as software, firmware, middleware, microcode, hardware description language, or any other name, the software is broadly interpreted to mean an instruction, a set of instructions, code, a code segment, a program code, a program, a subprogram, a software module, an application, a software application, a software package, a routine, a subroutine, an object, an executable file, an executable thread, a procedure, a function, and the like.

These software, instructions, information, and the like may also be transmitted and received via a transmission medium. For example, when software is transmitted from a website, server, or other remote source sing at least one of wired technology (such as a coaxial cable, fiber optic cable, twisted pair, digital subscriber line (DSL), etc.) and radio technology (infrared, microwave, etc.), at least one of these wireline technology and radio technology is included within the definition of the transmission medium.

The information, signals and the like described in this disclosure may be represented using any of a variety of different techniques. For example, data, an instruction, a command, information, a signal, a bit, a symbol, a chip, etc., which may be referred to throughout the above description may be represented by voltages, a current, electromagnetic wave, magnetic field or magnetic particle, optical field or photon, or any combination thereof.

The terms described in this disclosure and those necessary for understanding this disclosure may be replaced by a term having the same or similar meanings. For example, at least one of the channels and the symbols may be a signal (signaling). The signal may also be a message. The component carrier may also be referred to as a carrier frequency, cell, frequency carrier, or the like.

As used in this disclosure, the terms "system" and "network" are used interchangeably.

The information, parameters, and the like described in the present disclosure may also be expressed using an absolute value, relative value from predetermined value, or they may be expressed using corresponding separate information. For example, the radio resource may be those indicated by an index.

The name used for the parameters described above is not restrictive in any respect. In addition, the mathematical equations using these parameters may differ from those explicitly disclosed in this disclosure. Because the various channels (e.g., PUCCH, PDCCH, etc.) and information elements can be identified by any suitable name, the various names assigned to these various channels and information elements are not in any way limiting.

In this disclosure, the terms "Base Station (BS)", "Radio Base Station", "Base Station apparatus", "Fixed Station", "NodeB", "eNodeB (eNB)", "gNodeB (gNB)" "Access Point", "Transmission Point", "Reception Point", "Transmission/Reception Point", "Cell", "Sector", "Cell Group", "Carrier" "Component Carrier" and the like may be used interchangeably, and may be referred to in terms such as a Macro cell. Small cell, Femto cell, Pico cell and the like.

The base station can accommodate one or multiple (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH: Remote Radio Head), and the term "cell" or "sector" refers to a portion or all of the coverage areas of at least one of the base station and base station subsystem that provides communication services at the coverage.

In this disclosure, terms such as "mobile station", "user terminal", "user equipment", "terminal", and the like may be used interchangeably.

The mobile station may be referred to by one of ordinary skill in the art as a subscriber station, a mobile unit, a subscriber unit, a radio unit, a remote unit, mobile device, a radio device, a radio communication device, a remote device, a mobile subscriber station, an access terminal, a mobile terminal, a radio terminal, a remote terminal, a handset, a user agent, a mobile client, a client, or some other suitable term.

At least one of the base stations and the mobile station may be referred to as a transmitting device, receiving device, communication device, or the like. At least one of the base station and the mobile station may be a device mounted on the mobile body, a mobile body, or the like. The mobile may be a vehicle (e.g., a car, an airplane, etc.), an unmanned mobile (e.g., a drone, an automated vehicle, etc.), or a robot (manned or unmanned). At least one of the base station and the mobile station includes a device that does not necessarily move during communication operations. For example, at least one of the base station and the mobile station may be an IoT (Internet of Things) device such as a sensor.

In addition, the base station in the present disclosure may be read by the user terminal. For example, various modes/embodiments of the present disclosure may be applied for a configuration in which communication between base stations and user terminals is replaced by communication between multiple terminals 20 (e.g., may be referred to as D2D Device-to-Device), V2X (Vehicle-to-Everything), etc.). In this case, the terminal 20 may have the functions provided by the base station 10 described above. The phrases "upstream" and "downstream" may also be replaced by the phrases corresponding to terminal-to-terminal communication (e.g., "side"). For example, an upstream channel, a downstream channel, or the like may be read a side channel.

Similarly, the user terminal in the present disclosure may be read by the base station.

In this case, the base station may have the functions provided by the user terminal described above.

As used in this disclosure, the terms "judgement" and "determining" may encompass a wide variety of operations. "Judgment" or "determining" include, for example, judging, calculating, computing, processing, deriving, investigating, looking up, searching, inquiring (e.g., searching in tables, databases, or other data structures), ascertaining, and so forth. "Judgment" and "determining" may also include receiving (e.g., receiving information), transmitting (e.g., sending information), input, output, and accessing (e.g., accessing data in memory) as "judged" and "determined", and the like. "Judgment" and "decision" may also include "judgment" and "decision" regarding matters such as resolving, selecting, choosing, establishing, comparing, etc. That is, the "judgment" and the "decision" may include deeming some action to be "judgment" and "determination". "Decision" may be read as "Assuming", "Expecting", or "Considering", etc.

The term "connected" or "coupled" or any variation thereof means any direct or indirect connection or connection between two or more elements and may include the presence of one or multiple intermediate elements between two elements "connected" or "coupled" with each other. The coupling or connection between the elements may be physical, logical, or a combination of these. For example, "connection" may be read as "access". As used in the present disclosure, the two elements may be thought of as being "connected" or "coupled" to each other using at least one of the one or multiple wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "solely" unless otherwise specified. In other words, the expression "based on" means both "solely" and "at least based on".

Any reference to an element using a designation such as "first" or "second" as used in the present disclosure does not generally limit the amount or order of those elements. These designations can be used in the present disclosure as a convenient way to distinguish between two or more elements. Thus, references to the first and second elements do not imply that only two elements may be employed or that the first element must in some way precede the second element.

"Mean(s)" in the configuration of each of the above devices may be replaced by "part", "circuit", "device", etc.

When the terms "include", "including" and variations thereof are used in the present disclosure, these terms are intended to be comprehensive as well as the term "comprising". Moreover, the term "or" as used in this disclosure is not intended to be an exclusive-OR/exclusive disjunction.

The radio frame may consist of one or multiple frames in a time domain. One or multiple frames in the time domain may be referred to as subframes. The subframe may further includes one or multiple slots in the time domain. The subframe may be a fixed length of time (e.g., 1 ms) independent of the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, certain filtering processing performed by the transceiver in the frequency domain, and specific windowing processing performed by the transceiver in the time domain.

The slot may be formed by one or multiple symbols in the time domain, such as an OFDM (Orthogonal Frequency Division Multiplexing) symbol, SC-FDMA (Single Carrier Frequency Division Multiple Access symbol, and the like. The slot may be in a time unit based on a numerology.

The slot may include multiple mini-slots. Each mini-slot may be comprised of one or multiple symbols in the time domain. The mini slot may also be referred to as a subslot. The mini-slots may consist of fewer symbols than the slots. A PDSCH (or PUSCH) transmitted in time units greater than a mini-slot may be called a PDSCH (or PUSCH) mapping type A. PDSCH (or PUSCH) transmitted using mini-slots may be referred to as PDSCH (or PUSCH) mapping type B.

Radio frames, subframes, slots, mini-slots and symbols all represent time units for transmitting signals. Radio frames, subframes, slots, mini-slots and symbols, respectively, may be designated separately.

For example one subframe may be referred to as a Transmission Time interval (TTI), multiple consecutive subframes may be referred to as the TTI, and one slot or one mini-slot may be referred to as the TTI. That is, at least one of the subframes and the TTI may be a subframe (1 ms) in an existing LTE, a period shorter than 1 ms (e.g., 1-13 symbols), or a period longer than 1 ms. The unit representing the TTI may be referred to as a slot, a mini-slot, or the like, rather than a subframe.

The TTI refers, for example, to the minimum time unit for scheduling in radio communication. For example, in an LTE system, a base station schedules each terminal 20 to allocate radio resources (such as frequency bandwidth, transmit power, etc. that can be used in each terminal 20) in TTI units. The definition of TTI is not limited to this.

The TTI may be a transmission time unit, such as a channel-encoded data packet (transport block), code block, codeword, or the like, or may be a processing unit, such as a scheduling or link adaptation. When a TTI is provided, the time interval (e.g., the number of symbols) during which the transport block, code block, codeword, or the like is actually mapped may be shorter than the TTI.

If one slot or one mini-slot is referred to as the TTI, one or multiple TTIs (i.e., one or multiple slots or one or multiple mini-slots) may be the minimum time unit for scheduling. The number of slots (mini-slots) constituting the minimum time unit of the scheduling may also be controlled.

A TTI having a time length of 1 ms may be referred to as a TTI (usually a TTI in LTE Rel. 8-12), a normal TTI, a long TTI, a normal subframe, a normal subframe, a long subframe, a slot, and the like. A TTI that is typically shorter than an ordinary TTI may be referred to as a shortened TTI, a short TTI, a partial TTI (partial or fractional TTI), a shortened subframe, a short subframe, a mini-slot, a subslot, a slot, or the like.

The long TTI (e.g., ordinary TTI, subframe, etc.) may be interpreted as a TTI having a time length exceeding 1 ms, and the short TTI (e.g., shortened TTI, etc.) may be interpreted as a TTI having a TTI length less than the TTI length of the long TTI and a TTI length greater than 1 ms.

Resource blocks (RBs) are time domain and frequency domain resource allocation units and may include one or multiple consecutive subcarriers in the frequency domain. The number of subcarriers included in the RB may be the same, regardless of the numerology, for example 12. The number of subcarriers included in the RB may be determined on the basis of numerology.

The time domain of the RB may also include one or multiple symbols, which may be 1 slot, 1 mini-slot, 1 subframe, or 1 TTI in length. One TTI, one subframe, etc., may each consist of one or multiple resource blocks.

Note that one or multiple RBs may be referred to as physical resource blocks (PRBs), sub-carrier groups (SCGs), resource element groups (REGs), PRB pairs, RB pairs, and the like.

Resource blocks may also consist of one or multiple resource elements (RE). For example, 1 RE may be a radio resource area of one sub-carrier and one symbol.

The bandwidth part (BWP) (which may also be referred to as a partial bandwidth, etc.) may represent a subset of consecutive common RB (common resource blocks) for a given numerology in a carrier. Here, the common RB may be identified by an index of RB relative to the common reference point of the carrier.

A PRB is defined in a BWP and may be numbered within that BWP.

BWP may include BWP for UL (UL BWP) and BWP for DL (DL BWP). For a UE, one or multiple BWPs may be configured in one carrier.

At least one of the configured BWPs may be active, and the UE need not assume that it will send and receive predetermined signals/channels outside of the active BWP. The terms "cell" and "carrier" in this disclosure may be replaced by "BWP".

Structures such as radio frames, subframes, slots, mini-slots, and symbols described above are exemplary only. For example, the number of subframes included in a radio frame, the number of slots per subframe or radio frame, the number of mini-slots included in the slot, the number of symbols and RBs included in the slot or mini-slot, the number of sub-carriers included in the RB, the number of symbols in the TTI, the symbol length, the length of the cyclic prefix (CP) length, and the like may vary.

In the present disclosure, where an article is added by translation, for example a, an, and the English language disclosure may include that the noun following these articles is in a plural form.

In this disclosure, the term "A and B are different" may mean "A and B are different from each other". Incidentally, the term may mean "A and B are different from C". Terms such as "separated" or "combined" may be interpreted as well as "different".

The modes/embodiments described in this disclosure may be used alone, in combination, or switched with implementation. Notice of a given information (e.g. "X" notice) may also be given by implication (e.g. "no notice of the given information"), not explicitly.

In the present disclosure, the transmission unit 210 and the reception unit 220 are examples of communication units. "SCGFailureInformation" is an example of information indicating that a secondary cell group has experienced a failure.

While the present disclosure has been described in detail above, those skilled in the art will appreciate that the present disclosure is not limited to the embodiments described in the present disclosure. The disclosure may be implemented as modifications and variations without departing from the spirit and scope of the disclosure as defined by the claims. Accordingly, the description of the present disclosure is for illustrative purposes only and is not intended to have any restrictive meaning with respect to the present disclosure.

DESCRIPTION OF SYMBOLS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device

The invention claimed is:

1. A terminal, comprising:
a transceiver configured to perform communications with a first base station of a first Multi Radio Access Technology (RAT) that belongs to a master cell group and a second base station of a second Multi RAT different from the first Multi RAT that belongs to a secondary cell group;
a processor configured to detect an occurrence of a failure in communications via the secondary cell group; and
a transmitter configured to transmit, in a case where the processor detects the occurrence of the failure in the communications via the secondary cell group, a message that includes location information and that indicates the occurrence of the failure in the secondary cell group,
wherein the location information includes longitude and latitude indicating a point on an ellipsoid.

2. The terminal according to claim 1, wherein the location information further includes altitude.

3. A communication method performed by a terminal, the communication method comprising:
performing communications with a first base station of a first Multi Radio Access Technology (RAT) that belongs to a master cell group and a second base station of a second Multi RAT different from the first Multi RAT that belongs to a secondary cell group;
detecting an occurrence of a failure in communications via the secondary cell group; and
transmitting, in a case where the processor detects the occurrence of the failure in the communications via the secondary cell group, a message that includes location information and that indicates the occurrence of the failure in the secondary cell group,
wherein the location information includes longitude and latitude indicating a point on an ellipsoid.

4. A communication system comprising: a terminal and a first base station, wherein
the terminal includes:
a transceiver of the terminal configured to perform communications with the first base station of a first Multi Radio Access Technology (RAT) that belongs to a master cell group and a second base station of a second Multi RAT different from the first Multi RAT that belongs to a secondary cell group;
a processor configured to detect an occurrence of a failure in communications via the secondary cell group; and
a transmitter configured to transmit, in a case where the processor detects the occurrence of the failure in the communications via the secondary cell group, a message that includes location information and that indicates the occurrence of the failure in the secondary cell group, and the first base station includes:
- a transceiver of the first base station configured to provide a cell that belongs to the master cell group, and perform communications with the terminal, together with the second base station that belongs to the secondary cell group; and
- a receiver configured to receive the message from the terminal via a cell that belongs to the master cell group, wherein the location information includes longitude and latitude indicating a point on an ellipsoid.

* * * * *